(12) United States Patent
Lagrange (10) Patent No.: US 11,509,490 B2
(45) Date of Patent: Nov. 22, 2022

(54) PAIRING OF DEVICES IN A POWER NETWORK

(71) Applicant: CANON KABUSHIKI KAISHA, Tokyo (JP)

(72) Inventor: Pascal Lagrange, La Chapelle des Fougeretz (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/865,103

(22) Filed: May 1, 2020

(65) Prior Publication Data

US 2020/0358625 A1 Nov. 12, 2020

(30) Foreign Application Priority Data

May 7, 2019 (GB) ..................................... 1906395

(51) Int. Cl.
| | |
|---|---|
| *H04L 12/10* | (2006.01) |
| *H04L 5/00* | (2006.01) |
| *H04L 12/40* | (2006.01) |
| *H04W 12/50* | (2021.01) |

(52) U.S. Cl.
CPC ............ *H04L 12/10* (2013.01); *H04L 5/0055* (2013.01); *H04L 12/40045* (2013.01); *H04W 12/50* (2021.01)

(58) Field of Classification Search
CPC ....................................................... H04L 12/10
See application file for complete search history.

(56) References Cited

U.S. PATENT DOCUMENTS

| | | | |
|---|---|---|---|
| 9,377,794 B1 | 6/2016 | Dwelley et al. | |
| 2006/0290208 A1* | 12/2006 | Chang ..................... | H04L 12/10 307/116 |
| 2009/0100274 A1* | 4/2009 | Diab ....................... | H04L 12/10 713/300 |
| 2011/0150431 A1* | 6/2011 | Klappert ............... | G06F 1/3234 386/296 |
| 2015/0331464 A1 | 11/2015 | Balasubramanian et al. | |
| 2018/0237040 A1* | 8/2018 | Mong ..................... | H04L 67/61 |
| 2018/0375674 A1 | 12/2018 | Tu et al. | |

FOREIGN PATENT DOCUMENTS

| | | | |
|---|---|---|---|
| EP | 2903205 A1 | 8/2015 | |
| EP | 3588845 A1 | 1/2020 | |

* cited by examiner

*Primary Examiner* — Hsinchun Liao
(74) *Attorney, Agent, or Firm* — Canon U.S.A., Inc. IP Division (57) ABSTRACT

There are provided methods for associating an adapter controller with a device, among a plurality of devices, for instance a Power over Ethernet device or its controller, each device of the plurality being connected to a controller interconnected to other controllers by a power-over-data linear bus to which an item of power source equipment is also connected. The methods comprises an exchange of a pairing message comprising a unique identifier of the device to be paired with, wherein only said device from which is the pairing message receives power at the time of receiving the pairing message by the controller among the plurality of devices.

18 Claims, 8 Drawing Sheets

PAIRING OF DEVICES IN A POWER NETWORK

CROSS REFERENCE TO RELATED APPLICATION

This application claims the benefit under 35 U.S.C. § 119(a)-(d) of United Kingdom Patent Application No. 1906395.7, filed on May 7, 2019 and entitled "PAIRING OF DEVICES IN A POWER NETWORK". The above cited patent application is incorporated herein by reference in its entirety.

FIELD OF THE INVENTION

The present invention relates to a power over cable system. More specifically, the present invention relates to a method for controlling the association of an adapter device and a Power over Ethernet (PoE) edge device configured to be locally connected to the adapter device.

BACKGROUND OF THE INVENTION

In power over cable systems, such as Power over Ethernet (PoE) and Power over Coax (PoC), one or more devices are powered over network cables by an item of power sourcing equipment.

The power sourcing equipment (PSE) is a device such as a network switch that provides (sources) power on the network cable. A powered device (PD) refers to an apparatus powered by the PSE and thus consuming energy. Examples of powered devices include analog cameras, IP cameras including pan-tilt-zoom (PTZ) cameras, wireless access points (AP), and VoIP phones.

Figure 1:
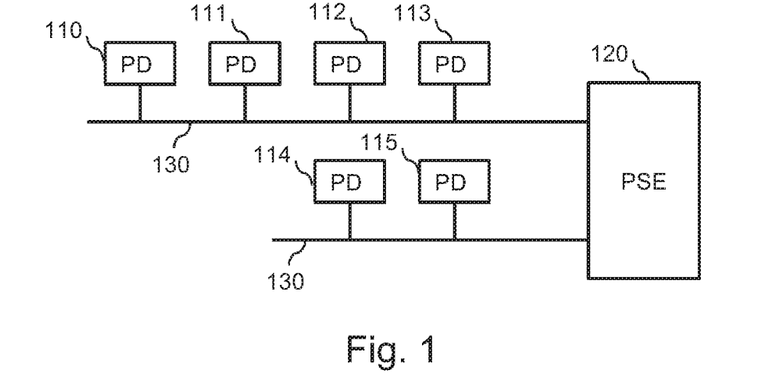
FIG. 1, previously described, illustrates a power over cable system comprising a PSE and a plurality of PDs.

FIG. 1 is an illustration of a power over cable system comprising a PSE 120, a plurality of PDs 110, 111, 112, 113, 114 and 115, and two network cables 130. Each network cable 130 connects, according to a linear bus topology, a plurality of PDs 110-115 to one port of the PSE 120. Each network cable and associated PDs form a network segment.

A Powered Device (PD) is typically made of a PoC Adapter device connected to a Power over Ethernet (PoE) Terminal device, such as an IP camera, through an Ethernet cable.

An Adapter device usually consumes a low amount of power (typically less than 4 W) while a Terminal device has a greater demand in power consumption (typically from 7 W up to 20 W and more). Therefore, a controller device embedded inside an Adapter device may have limited processing resources, limiting its operations to voltage sensing and basic message processing, while a Terminal device may embed more powerful processing unit allowing for more complex algorithms and protocols processing.

The PoC Adapter device typically implements medium sensing features, such as line voltage sensing, which may be managed by a low-power processing controller. The obtained voltage measurement values may then be used by the controller of the Terminal device as data inputs for performing advanced protocols and algorithms consisting of, for instance, the determination of electrical characteristics of the power line as described in WO2018007363A1.

Therefore, a Terminal device may need to send specific control and command messages to the Adapter device to which it is connected, which requires for both the Adapter device and its connected Terminal device, the knowledge of their network identifiers, e.g. Ethernet MAC address or IP address.

Configuring each Adapter device manually and their connected Terminal device would, however, require a significant amount of time, especially when considering large-scale installations with hundreds of thousands of devices, e.g. large-scale video surveillance systems in airports, subways or cities made of hundreds up to one thousand IP camera devices.

CN107508714 discloses a network configuration method for Bluetooth equipment based on a Bluetooth mesh. Such method may be useful for ensuring that two wireless devices that are in each other's range in a wireless mesh network will associate.

However, this method cannot be applied in a network that does not rely on a mesh relay scheme, for instance in a network where a message issued by one particular device is broadcast over the whole communication medium, such as a coaxial cable, to the other devices without being relayed by any of these devices.

SUMMARY OF THE INVENTION

The present invention has been devised to address at least one of the foregoing concerns.

According to a first aspect of the invention, there is provided a method for associating a controller with a device among a plurality of devices, each device of the plurality being connected to a controller interconnected to other controllers by a power-over-data linear bus to which an item of power source equipment is also connected, the method comprising the following steps, performed at the controller:
  receiving a pairing message from a device of the plurality of devices, said pairing message comprising a unique identifier of the device;
  processing the received pairing message for pairing the controller with the device from which the pairing message is received;
wherein only said device among the plurality of devices from which the pairing message is received receives power at the time of receiving the pairing message by the controller among the plurality of devices.

Thanks to the first aspect, which provides for a pairing protocol proposal, the startup process is improved. The adapter device and its connected device can be paired in a seamless way, thus allowing the adapter to address specifically the device attached to it, and vice versa.

The method according to the first aspect may further comprise the following steps:
  determining an activation time period, wherein the activation time period is different for each device of the plurality;
  upon expiry of said activation time period, powering on the corresponding device.

The method according to the first aspect may further comprise measuring the voltage at the terminals of the controller connected to the device, wherein determining the activation time period is based on the measured voltage.

According to embodiments, the activation time periods are computed such that the duration of exchange of messages over the power-over-data linear bus is short compared to the difference between two activation time periods.

According to embodiments, the controller ignores any pairing message received before the activation time period expiry.

According to embodiments, the activation time period is computed by means of a strictly monotonic function.

According to embodiments, the pairing message is broadcast.

The method according to the first aspect may further comprise sending an acknowledgment message comprising an identifier of the controller, in response to the pairing message received.

According to embodiments, sending an acknowledgment message a consists in broadcasting the acknowledgment message.

According to a second aspect of the invention, there is provided a controller device of an adapter device, the controller device being configured to:
- receive a pairing message from a device of a plurality of devices, said pairing message comprising a unique identifier of the device, each device of the plurality being connected to a controller interconnected to other controllers by a power-over-data linear bus to which an item of power source equipment is also connected;
- process the received pairing message for pairing the controller device with the device from which the pairing message is received;
- wherein only said device among the plurality of devices from which the pairing message is received receives power at the time of receiving the pairing message by the controller among the plurality of devices.

According to a third aspect of the invention, there is provided a method for associating a controller with a device among a plurality of devices, each device of the plurality being connected to a controller interconnected to other controllers by a power-over-data linear bus to which an item of power source equipment is also connected, the method comprising the following steps, performed at the device:
- upon powering on, sending a pairing message, said pairing message comprising a unique identifier of the device;
- receiving an acknowledgment message from a controller connected to the linear bus, the acknowledgment message comprising an identifier of the controller; and
- processing the received acknowledgment message for pairing the device with the controller from which the acknowledgment message is received;
- wherein only said device receives power at the time of sending the pairing message by the device among the plurality of devices.

According to embodiments, the device is powered on upon expiry of an activation time period, and the activation time period is different for each device of the plurality.

According to embodiments, the activation time periods are computed such that the duration of exchange of messages over the power-over-data linear bus is short compared to the difference between two activation time periods.

According to embodiments, the activation time period is based on the voltage measured at the terminals of the controller from which the acknowledgment message is received.

According to embodiments, the device ignores any acknowledgment message or pairing message received after said pairing.

According to embodiments, the activation time period is computed by means of a strictly monotonic function.

According to embodiments, sending a pairing message consists in broadcasting the pairing message.

According to a fourth aspect of the invention, there is provided a controller device of a Power over Ethernet (PoE) edge device of a plurality of PoE devices, each PoE device of the plurality being connected to a controller interconnected to other controllers by a power-over-data linear bus to which an item of power source equipment is also connected, the controller device being configured to:
- upon powering on, sending a pairing message, said pairing message comprising a unique identifier of the PoE edge device;
- receiving an acknowledgment message from a controller connected to the linear bus, the acknowledgment message comprising an identifier of the controller; and
- processing the received acknowledgment message for pairing the PoE edge device with the controller from which the acknowledgment message is received;
- wherein only said PoE edge device receives power at the time of sending the pairing message by the PoE edge device among the plurality of devices.

BRIEF DESCRIPTION OF THE DRAWINGS

Other particularities and advantages of the invention will also emerge from the following description, illustrated by the accompanying drawings, in which.

Note that same references are used across different figures when designating same elements.

DETAILED DESCRIPTION OF EMBODIMENTS OF THE INVENTION

In the following description, the pairing process (or association) is performed between an adapter controller and a PoE device or an adapter controller and a controller of (within) a PoE device.

Figure 2:
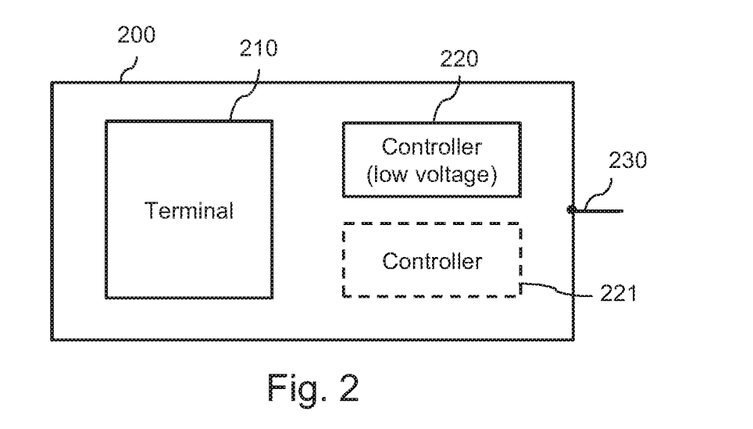
FIG. 2 schematically shows a powered device arrangement that is adapted to embed embodiments of the invention.

FIG. 2 schematically shows an arrangement of powered device 200 that is configured to embed embodiments of the invention.

The powered device comprises a terminal 210 and a controller 220.

The terminal 210 represents the core unit of the powered device providing the main functions of the device. The terminal 210 is for example a camera unit having the task of capturing a scene and transmitting data content—e.g. video stream(s)—over the network to a destination device which may be another device of the network or a remote device connected to the network. More generally, the terminal may be a communication unit configured to send and/or receive data over/from the network and drawing its power over the cable from a PSE.

Sufficient electric power needs to be drawn from the cable in order to run the functions of the terminal properly. For that purpose, the controller 220 is in charge of controlling the startup of the terminal 210 depending on the power available over the cable. The controller 220 is thus configured to at least determine if the terminal 210 can be activated.

The controller 220 operates at low power conditions (low voltage) compared to the consumption of the terminal. This means that a low voltage, e.g. 5 volts, is sufficient to activate the controller, while the terminal requires a higher voltage, e.g. 40 volts, to activate. Consequently, the controller 220 is started up first and is in charge of executing basic startup control functions requiring only a limited power amount from the network.

Optionally, the powered device 200 may embed another controller 221 capable of drawing more power (e.g. operating at nominal or intermediate voltage values 36, 48 or 56 V) if more advanced control functions are needed.

In the figure the powered device is represented as a single device comprising the terminal and the one or more controllers. This is for illustration only. The powered device 200 may be physically formed by two or more interconnected devices embedding the terminal and the one or more controllers. For example, one device may contain the terminal 210 and another one the controller 220 (as in the arrangements represented in FIGS. 3a to 3b).

Also, it is assumed that the voltage supplied at the input 230 of the powered device 200 from the cable (referred to as Vin) will slightly differ (i.e. less than 2V), if not the same, as the voltage that can be supplied to the terminal 210 (voltage drop due to the consumption of controllers is limited).

Figure 3A:
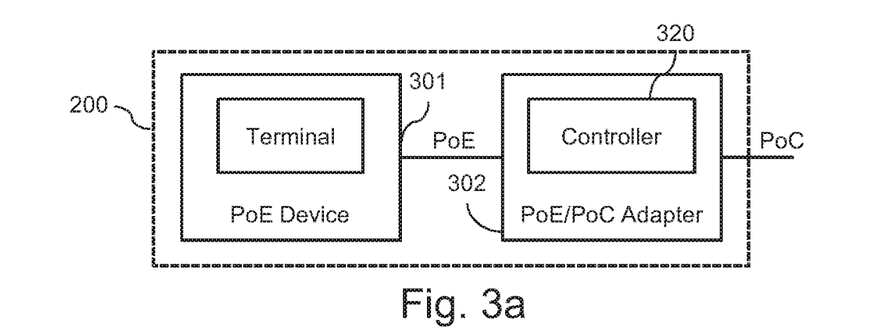
FIGS. 3a, and 3b represent different exemplary arrangements of the powered device.
Figure 3B:
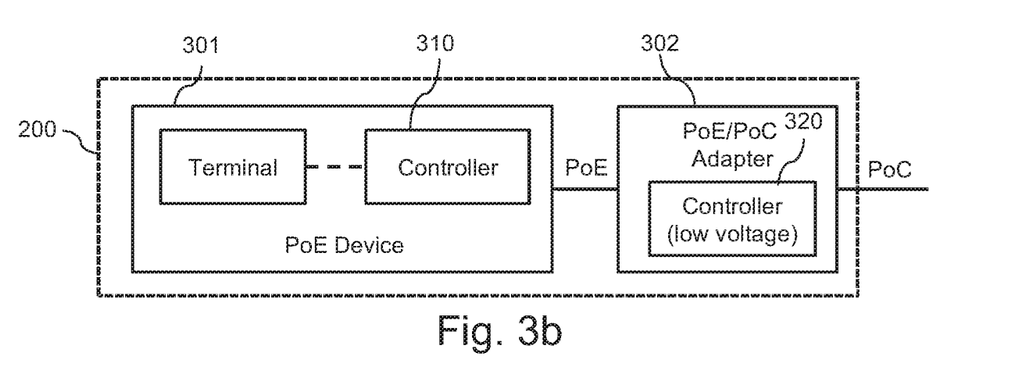

FIGS. 3a and 3b represent different exemplary implementations (arrangements) of the powered device 200. For all these arrangements, it is assumed that the powered device is connected to a Power-over-Coax (PoC) network.

FIG. 3a represents an arrangement in which the terminal is embedded in a Power-over-Ethernet (PoE) device 301, while the controller is embedded in a PoE/PoC adapter 302. The adapter 302 communicates with the PoE device 301 by means of an Ethernet protocol over an Ethernet cable, also applying PoE protocol for enabling power to the Terminal, and is connected to the network via a PoC interface. The PoE/PoC adapter role is to adapt between the formats PoE and PoC. Both the PoE device 301 and the PoE/PoC adapter 302 form the powered device 200. In this arrangement, the controller may consume either low (e.g. less than 4 W) or high power (e.g. more than 4 W).

FIG. 3b represents an arrangement variant in which both the PoE device 301 and the adapter device 302 embed a controller module 310/320. In this arrangement, each of the controllers 310 and 320 may consume either low (e.g. less than 4 W) or high power (e.g. more than 4 W). However, the controller 320 in the adapter will preferably consume low power (e.g. less than 4 W).

Figure 4A:
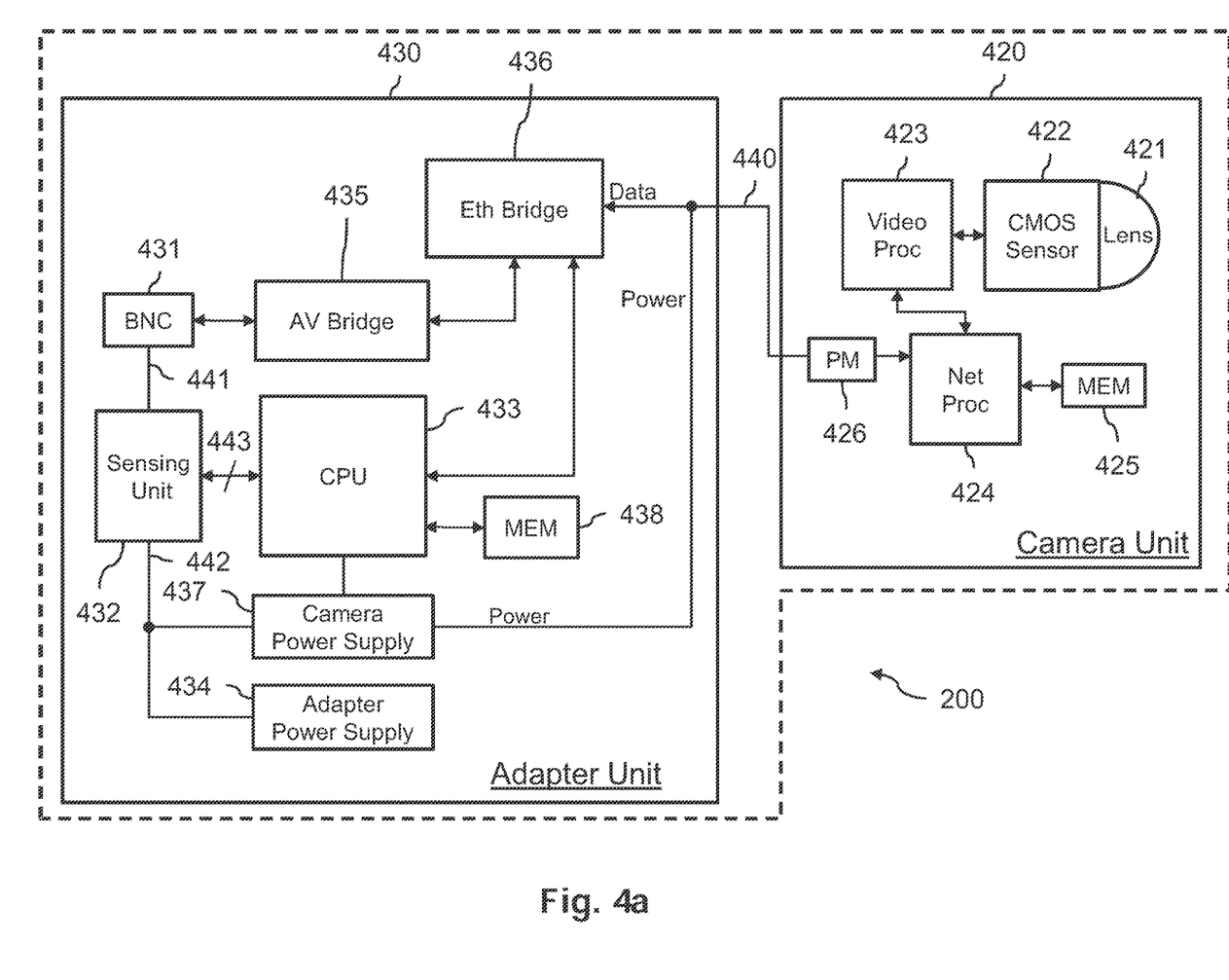
FIG. 4a is a functional block diagram illustrating an implementation example of a powered device comprising an adapter unit and a camera unit.

FIG. 4a is a functional block diagram illustrating an implementation example of a powered device 200. In the illustration, the terminal is considered to be a camera unit. Other functional units may, of course, be considered.

The device 200 comprises a PoE camera unit 420 (or "network camera") and an adapter unit 430 connected by a cable 440, the cable 440 being for example an Ethernet link with Power over Ethernet capability for both data and power transmission.

The camera unit 420 comprises a lens 421, a sensor 422 (for example, a CMOS sensor), a video processor 423, a network processor 424, at least one memory 425 (a non-volatile memory, a read-access-memory RAM, a Flash memory, etc.), and a power module PM 426 powering the camera unit 420 via the cable 440. The camera unit 420 thus provides the core device functions of image capture (optics), image processing and memory, and may thus be considered as the "functional unit" of the device 200.

The adapter unit 430 comprises a connector 431, a sensing unit 432, a processor 433 ("Central Processing Unit" or CPU), an adapter power supply module (subsystem DC/DC converter) 434, a camera power supply module 437, an audio/video AV bridge 435, an Ethernet bridge 436, and at least one memory 438.

The connector 431, for example a BNC port, connects the device 200 to the PSE 120 (by means of the cable segment 130), allows the IP communications such as HomePlug® AV packets over coax cable, and provides power to the device 200.

The sensing unit 432 has an input connection from the connector 431 by means of a wire 441, receiving power thereby, and has an output connection to the adapter power supply 434 and to the camera power supply 437 by means of a wire 442, supplying these latter with power. The sensing unit 432 is further connected to the processor 433 by means of one or more wires 443 for the exchange of data and/or commands.

The sensing unit 432 implements a circuit for measuring physical quantities such as the voltage at the connector 431. The sensing unit 432 is configured to exchange data/commands with the processor 433, e.g. receive commands from the processor and provide the result of measurements to the processor by means of the wire(s) 443. This allows the processor to calculate parameters such as the cable resistance, as will be described in further detail with reference to FIG. 4b.

The adapter power supply 434 powers the adapter unit 430, in particular a communication subsystem comprising the processor 433, the audio/video bridge 435, the Ethernet bridge 436, and the memory 438 (power connections not shown). The camera power supply 437 powers the camera unit 420 (more specifically, the power module PM 426) via the cable 440.

The AV bridge 435 ("Home Plug AV Bridge") encapsulates core camera IP traffic into HomePlug® AV packets and sends the packets on the coax cable through the connector 431, and extracts IP traffic from received HomePlug® AV packets and forwards this IP traffic to the camera unit 420. The Ethernet bridge 436 is connected to the camera unit 420, the processor 433, and the AV bridge 435, receiving IP traffic from each and combining the IP traffic. The processor 433 is capable of exchanging messages with other devices (e.g. cameras) of the same power segment and with the local camera unit 420 via the Ethernet bridge 436.

It should be noted that any message provided by the processor 433 or by the network processor 424, that is sent across the Ethernet Bridge 436 is automatically forwarded on each of the ports of the Ethernet Bridge 436.

Therefore, a message from the network processor 424 will be forwarded by the Ethernet bridge 436 to both the processor 433 and the AV Bridge 435 (and therefore over cable 130 through BNC connector 431) while a message issued by the processor 433 will be forwarded by the Ethernet bridge 436 to both the network processor 424 (via cable 440) and the AV Bridge 435 (and therefore over cable 130 through BNC connector 431).

The powered device of FIG. 4a is an example of the arrangement shown in FIG. 3b, in which the PoE device 301 is the camera unit 420 and the PoE/PoC adapter 302 is the adapter unit 430.

Figure 6:
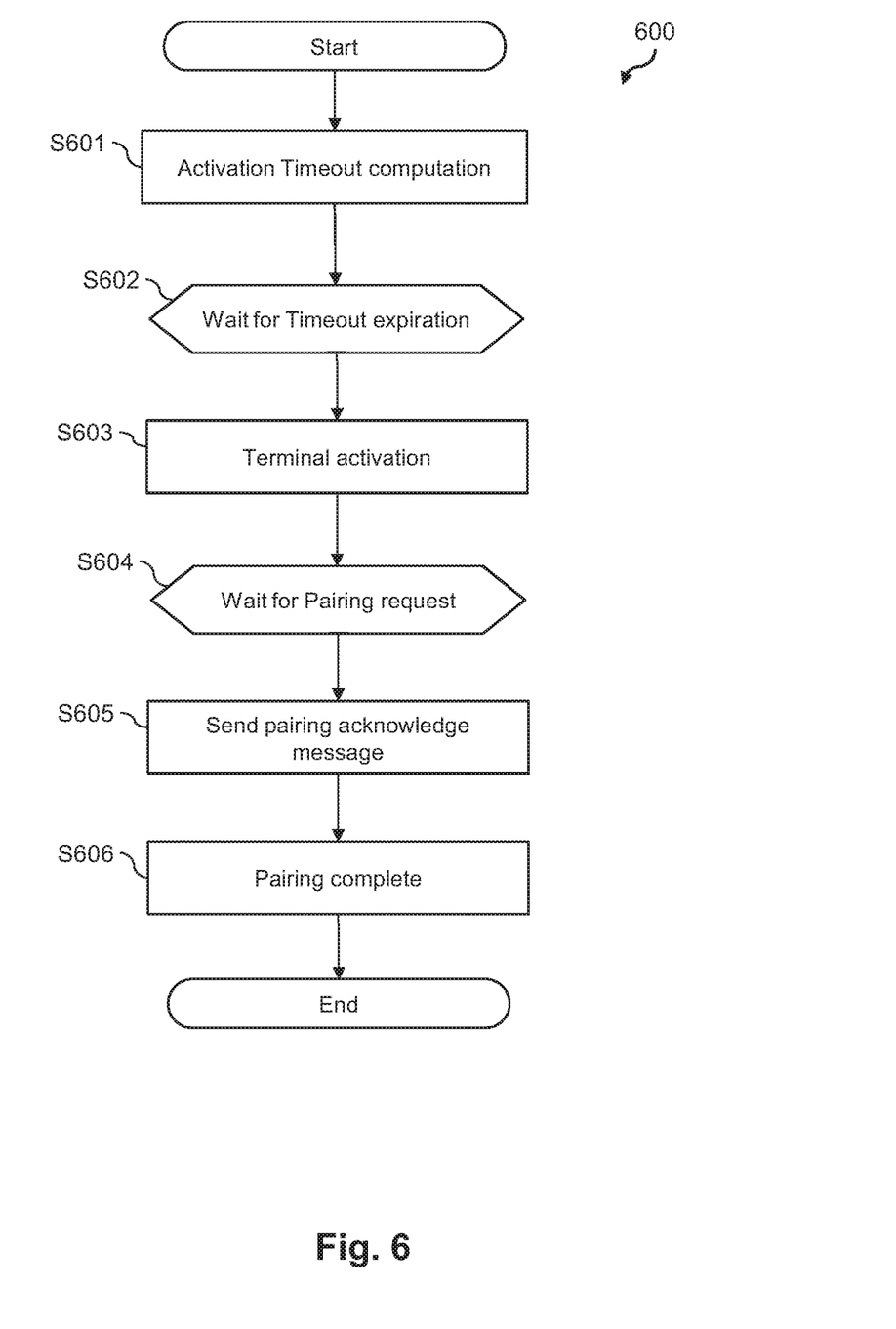
FIG. 6 is a flowchart illustrating the operation of a controller module in an Adapter device according to embodiments of the invention.
Figure 7:
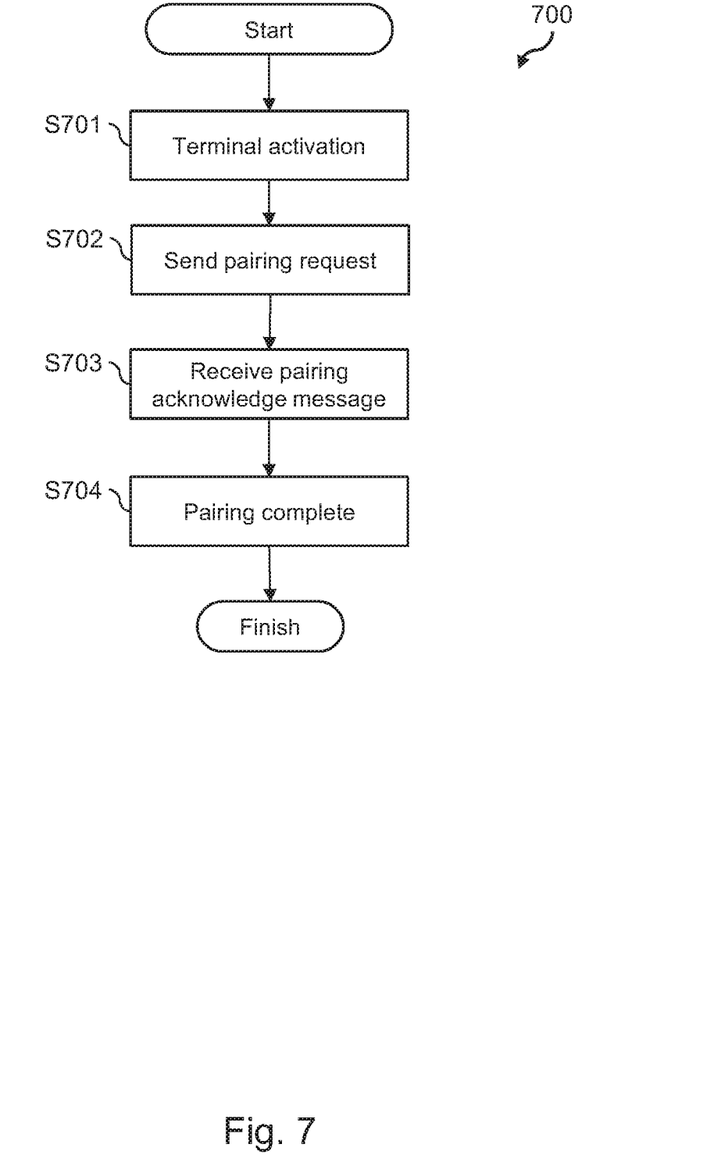
FIG. 7 is a flowchart illustrating the operation of a controller module associated with a Terminal device according to embodiments of the invention.

According to this arrangement, the controller is preferably implemented in the adapter unit 430, which means that the steps of FIG. 6 are executed by the processor 433 of the adapter unit, while the steps of FIG. 7 are executed by the network processor 424.

Note that it is preferable to have the sensing unit implemented within the adapter unit to perform direct measurements of the voltage at the input of the powered device.

Dedicated means are then established to allow exchange of data/commands between the controller and the sensing unit.

Figure 4B:
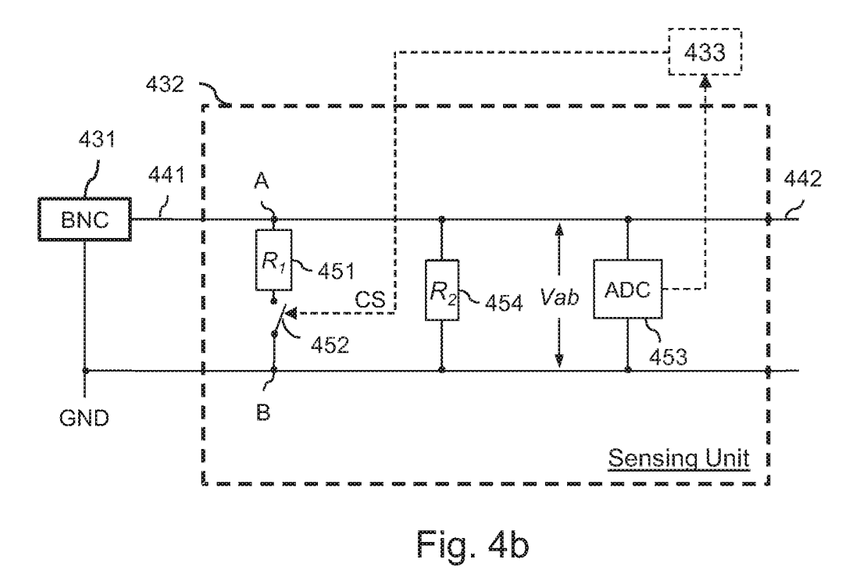
FIG. 4b illustrates a functional block diagram of a sensing unit configured to perform line voltage sensing.

FIG. 4b is a functional block diagram illustrating the operation of the sensing unit 432 shown in FIG. 4a. As previously stated in relation with FIG. 4a, the sensing unit 432 comprises a wire 441 connecting it to the connector 431 on input and a wire 442 connecting it to the adapter power supply 434 and to the camera power supply 437, as well as lines 443 connecting it to the processor 433.

The sensing unit 432 comprises a first resistance $R_1$ 451, a second resistance $R_2$ 454, a switch 452 (such as a transistor) and an analog to digital converter 453. The first resistance 451 and the second resistance 454 are mounted in parallel to the power source originating from the connector 431. The value of R1 is for example 1 KΩ and the value of R2 is for example 100 KΩ. The power consumption of the second resistance R2 is considered negligible compared to both the power consumption of the first resistance 451 and power supply capability. The first resistance 451 is thus used to modify the operating condition of the device 200 by increasing its power consumption.

The first resistance 451 and the switch 452 are in series between a node A and a node B of the circuit. The switch 452 is controlled by a control signal CS provided by processor 433 (represented in dotted lines). Activation of the switch 452 causes it to close, coupling the resistance 451 between the nodes A and B. Deactivation of the switch 452 causes it to open, decoupling the resistance 451 from the nodes A and B. The converter 453 measures a voltage value Vab between the nodes A and B, and supplies a measured voltage value to the processor 433. Alternatively, the converter 453 may be integrated within the processor 433 and connected by wires to the nodes.

Figure 5A:
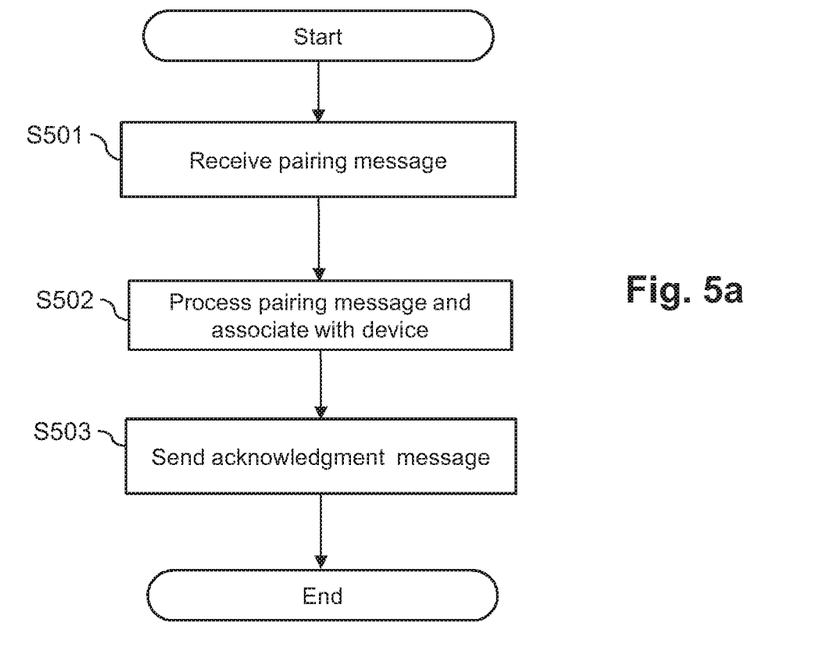
FIG. 5a is a flowchart illustrating operation of a controller module embedded in an Adapter device according to general embodiments of the invention.

FIG. 5a is a flowchart illustrating operation of a controller module 320 embedded in an Adapter device 302, as shown in FIGS. 3a and 3b, according to general embodiments of the invention.

At step S501, the controller module 320 receives a pairing message from a PoE device 301. This pairing message comprises a unique identifier of the PoE device 301.

According to general embodiments, only one PoE device 301 of the power network is powered on at the time of receiving a pairing message by the controller.

For instance, this may be achieved using an activation time period different for each PoE device, upon expiry of which the corresponding PoE device 301 may receive power.

According to an embodiment, the controller module 320 may thus determine such an activation time period, for instance based on a voltage measured at its terminals. Advantageously, due to the resistive nature of the power network, the measured voltage Vin at the input of each device is different and thus the activation time periods derived from these voltage measures are also different.

For example, the activation time period can be determined based on the corresponding voltages by means of a strictly monotonic (one-to-one) function. The function can also be chosen to be highly discriminative so that a small voltage difference may lead to a significant difference.

Preferably, the activation time periods are computed such that the duration of exchange of messages over the power network is short compared to the difference between two activation time periods. The computation is performed so as to ensure that the adapters operate sequentially without conflicts/overlapping.

At step S502, the controller module 320 processes the pairing message received at step S501 and associates with the PoE device from which is the pairing message.

For instance, it may store the unique identifier in a dedicated memory.

According to embodiments, the controller module 320 sends back an acknowledgment message including its unique identifier (S503).

Figure 5B:
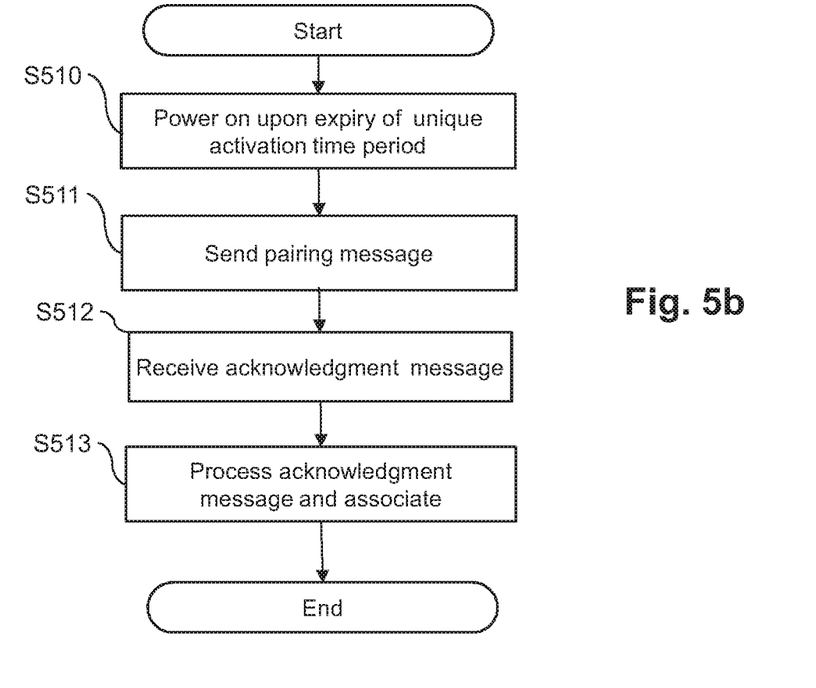
FIG. 5b is a flowchart illustrating operation of a PoE device according to general embodiments of the invention.

FIG. 5b is a flowchart illustrating operation of PoE device 301, as shown in FIGS. 3a and 3b, according to general embodiments of the invention.

At a first step S510, the PoE device 301 is powered on by an adapter device connected to the power source, upon expiry of the activation time period described before. The activation time period is different for each adapter device. Hence, only one PoE device is powered on at a time.

At step S511, the PoE device 301 thus powered sends a pairing message comprising its unique identifier. Preferably, the pairing message is broadcast over the power network.

At step S512, the PoE device 301 receives an acknowledgment message from a controller, for instance the controller 320 of an adapter device. The acknowledgment message comprises an identifier of the controller.

At step S513, the PoE device 301 processes the acknowledgment message received at step S512 and associates with the controller from which is the acknowledgment message. For instance, it may store the unique identifier in a dedicated memory.

FIG. 6 is a flowchart illustrating operation of a controller module 320 embedded in an Adapter device 302, as in FIG. 3b, according to embodiments of the invention.

At step S601, the controller 320 determines a Terminal activation timeout.

For this purpose, the controller 320 may measure the input voltage $V_{in}$ at its input 230 and derive a timeout value from the measured voltage $V_{in}$.

Benefit is taken from the fact that the voltage $V_{in}$ at the input of each device is different due to the resistive nature of the network, and thus the waiting time periods derived from these voltages are thus also different. For example, the time periods can be determined based on the corresponding voltages by means of a strictly monotonic (one-to-one) function. The function can also be chosen to be highly discriminative so that a small voltage difference may lead to a significant time period difference.

Preferably, the timeout values computed such that the duration of exchange of messages over the power network is short compared to the difference between two timeout values. The computation is performed so as to ensure that the adapters operate sequentially without conflicts/overlapping.

At step S602, a time period is set by the controller 320 based on the previously computed timeout elapse of which the controller 320 must await before performing the following steps.

If the time period expires without receiving any pairing request message 810 (see FIG. 8) from another PD's controller device 310, the controller 320 considers that it is the only controller on the power segment having the opportunity to start up its Terminal device.

Therefore, at step S603, the controller 320 enables the power for its Terminal device and sets a PD activation flag to '1' in a local memory 438 before performing step S604.

Back to step S602, if a pairing request message 810 is received from a remote PD while the timeout has not expired, the controller 320 simply ignores this message and remains in step S602. In order for the several adapters sharing one same segment to operate sequentially without conflicts/overlapping, each PD implements a timeout generation function, which generates a timeout value to be used as an input for a local timer.

This timeout is a function of the measured voltage Vin at the input of each device and is such that once a timeout expires for a given PD on the power segment, no pairing request message 810 is under processing by any other PD on the line.

For instance, let's assume that $T_{max\_processing}$ is the maximum timing for processing a paring request message 810. $T_{max\_processing}$ may be easily determined by the one skilled in the art considering the nature of the cable, the nature of the communication protocol to be used for carrying messages over this cable medium and the minimum voltage difference $\Delta V_{in\_min}$ between any two consecutive PD on the line. For instance, for a typical coaxial cable, e.g. RG-59, used to carry messages according to the HomePlugAV2 standard, the value of $T_{max\_processing}$ may be set to 5 seconds.

According to an embodiment of the invention, the timeout value $T_{timeout}$ for a given PD may be given by the following formula:

$$T_{timeout} = T_{max\_processing} \times \left(\frac{V_{in}}{\Delta V_{in\_min}}\right)$$

In one embodiment of the invention, the above formula may also be a function of the minimum operating voltage for the several PoE devices on the line. The minimum operating voltage $V_{min\_operation}$ defined by IEEE802.3af/PoE standard is 30V, which means that no PoE device will start up below this 30V threshold value.

In such case, the timeout value $T_{timeout}$ for a given PD may be given by the following formula:

$$T_{timeout} = T_{max\_processing} \times \frac{(V_{in} - V_{min\_operation})}{\Delta V_{in\_min}} + T_0$$

Where $T_0$ is a timing offset corresponding to the minimum value for $T_{timeout}$.

For instance, $T_0$ may be set to 10 seconds.

Once in the operating state S604, the controller waits for the reception of a pairing message forwarded by the Ethernet Bridge 436.

As there cannot be more than one controller in state S604 at a given instant (as a result of the actions of S601), only the controller that has previously started its Terminal device (and thus set its PD activation flag to '1' in its memory 438) should respond to a pairing request message.

Figure 8:
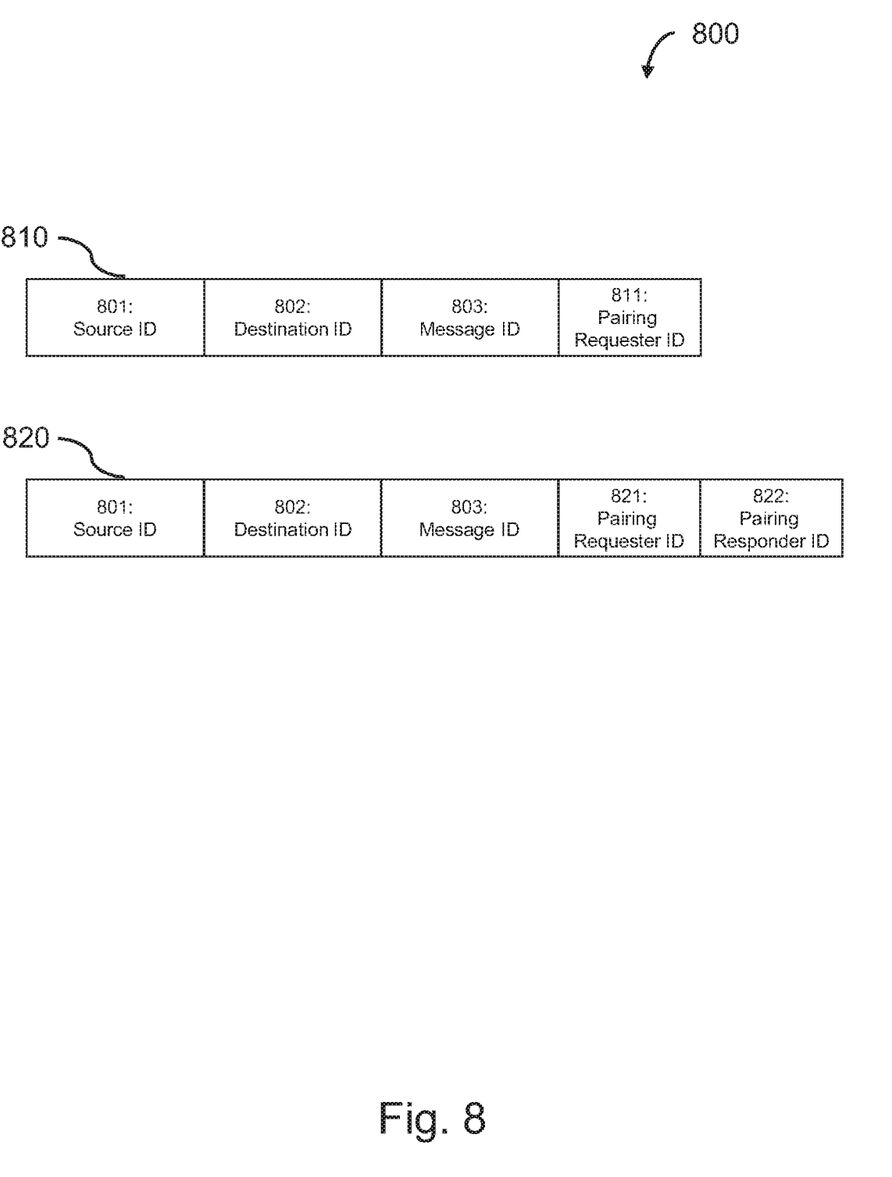
FIG. 8 illustrates a group of messages that may be exchanged between the devices of the invention, according to an embodiment.

Therefore, at step S605, the controller retrieves the unique identifier 811 (see FIG. 8) from the received pairing request message 810 and sends back a pairing acknowledgment message 820 (see FIG. 8).

This pairing acknowledgment message 820 is forwarded by the Ethernet Bridge 436 to both the cable 130 via the AV Bridge 430 (and is thus received by all the controllers 320 of the network) and the local network controller 424, i.e. the controller 310.

Eventually, the controller 320 records in memory 438 the unique identifier 811 it retrieved from the received pairing request message 810 in S604, resets the PD activation flag to '0' and moves to the Pairing complete state S606.

This unique identifier 811 will be used from now on by the controller 320 for setting the destination field, such as field 802 (see FIG. 8), when sending any message destined specifically to its local Terminal device. The controller 320 also understands from now on that any message received with a source field, such as field 801 (see FIG. 8), set to this unique identifier 811 is actually coming from its local Terminal device.

If a pairing request message 810 is received from a remote PD at step S606, the controller 320 simply ignores this message.

FIG. 7 is a flowchart illustrating operation of a controller module 310 associated with a Terminal device according to embodiments.

At step S701, the controller 310 associated with the Terminal device receives power (is activated) further to enabling step S603 shown in FIG. 6.

At step S702, the controller 310 sends a pairing request message 810 over the network. This pairing request message 810 is typically received by the controller 320 of its Adapter device at step S604.

At step S703, the controller 310 receives a pairing acknowledge message 820 responsive to the pairing request message 810. The controller 310 records in memory 425 the unique identifier 822 included in this pairing acknowledge message 820 and moves to the Pairing complete state S704.

This unique identifier 822 will be used from now on by the controller 310 for setting the destination field, such as field 802, when sending any message destined specifically to its local Adapter device. The controller 310 also understands from now on that any message received with a source field, such as field 801, set to this unique identifier 822 is actually coming from its local Adapter device.

If a pairing request message 810 is received from a remote PD while in state S704, the controller 310 simply ignores this message.

FIG. 8 illustrates a group 800 of messages 810 and 820 exchanged between any two PoC devices 200 (FIG. 2) when performing steps 600 and 700 shown in FIGS. 6 and 7.

The controller 310/320 has thus the ability to manage the execution of the steps of FIGS. 6 and 7 whenever required by the arrangement of the PD.

In the embodiment shown in FIG. 8, the messages 810 and 820 all comprise a source identification 801, a destination identification 802, and a message identification 803.

The source identification 801 identifies the entity emitting the message, such as the MAC or IP address of the terminal or of the unit embedding the controller (such as the adapter unit).

The destination identifier 802 identifies the entity targeted by the message, such as the MAC or IP address of the terminal or of the unit embedding the controller (such as the adapter unit).

The message identifier 803 uniquely identifies the message.

It may be noted that in various embodiments, the source ID 801 or destination ID 802 may not be used.

Message 810 is a pairing request message used by the controller 310 (source) in step S702 (FIG. 7) to request a pairing action with the controller of the Adapter device 320 (destination) it is locally connected through cable 440. Therefore, Pairing Requester identifier information 811 is thus appended to the message 810, and may provide one or more unique identifier of the Powered Device the controller 310 belongs to.

In one variant, information 811 includes the Ethernet MAC address of the Powered Device. In another variant, information 811 also includes the IP address of the Powered Device.

Message 810 is a pairing acknowledge message used by the controller 320 (source) in state S605 (FIG. 6) to request a pairing action with the controller of the controller 310 (destination) it is locally connected through cable 440. Therefore, Pairing acknowledgment identifier information 822 is thus appended to the message 810, and may provide one or more unique identifier of the Adapter Device 302 the controller 320 belongs to.

In one variant, information 822 includes the Ethernet MAC address of the Adapter Device 302.

In another variant, information 822 also includes the IP address of the Adapter Device 302.

Pairing Requester identifier information 821 may also be appended to the message 820 so as to keep track of the Powered device that previously issued the pairing request message 810 that triggered message 820. Pairing Requester identifier information 821 is therefore a duplicate of the information 811 embedded in the pairing request message 810 that triggered message 820.

Although the present invention has been described hereinabove with reference to specific embodiments, the present invention is not limited to the specific embodiments, and modifications which lie within the scope of the present invention will be apparent to a person skilled in the art. In particular different features from different embodiments may be interchanged, where appropriate. Many further modifications and variations will suggest themselves to those versed in the art upon making reference to the foregoing illustrative embodiments, which are given by way of example only and which are not intended to limit the scope of the invention as determined by the appended claims.

The invention claimed is:

1. A method for associating a controller of an adapter device with a Power over Ethernet (PoE) device among a plurality of PoE devices, each PoE device of the plurality of PoE devices being connected to the controller of the adapter device interconnected to other controllers of other adapter devices by a power-over-data linear bus to which an item of power source equipment is also connected, the method comprising the following steps, performed at the controller of the adapter device:

powering on its connected PoE device at an activation time different for each PoE device so that the powering on of the PoE devices does not overlap, and during the powering on of the connected PoE device:

receiving a pairing message from a PoE device of the plurality of PoE devices, the pairing message comprising a unique identifier identifying the PoE device; and processing the received pairing message for pairing the controller of the adapter device with the PoE device from which the pairing message is received.

2. The method of claim 1, further comprising the following steps:

determining an activation time period, wherein the activation time period is different for each PoE device of the plurality of PoE devices;

upon expiry of the activation time period, powering on the corresponding PoE device.

3. The method of claim 2, further comprising measuring the voltage at terminals of the adapter device controller connected to the PoE device, wherein determining the activation time period is based on the measured voltage.

4. The method of claim 2, wherein the activation time periods are computed such that the duration of exchange of messages over the power-over-data linear bus is short compared to the difference between two activation time periods.

5. The method of claim 2, wherein the controller of the adapter device ignores any pairing message received before the activation time period expiry.

6. The method of claim 2, wherein the activation time period is computed by means of a strictly monotonic function.

7. The method of claim 1, wherein the pairing message is broadcast.

8. The method of claim 1, further comprising sending an acknowledgment message comprising an identifier identifying the controller of the adapter device, in response to the pairing message received.

9. The method of claim 8, wherein sending an acknowledgment message a consists in broadcasting the acknowledgment message.

10. A controller of an adapter device in a Power over Cable system having a plurality of Power over Ethernet (PoE) devices, each PoE device of the plurality of PoE devices being connected to the controller of the adapter device interconnected to other controllers of other adapter devices by a power-over-data linear bus to which an item of power source equipment is also connected, the controller of the adapter device being configured to:

power on its connected PoE device at an activation time different for each PoE device so that the powering on of the PoE devices does not overlap, and during the powering on of the connected PoE device:

receive a pairing message from a PoE device of the plurality of PoE devices, the pairing message comprising a unique identifier identifying the PoE device;

process the received pairing message for pairing the controller of the adapter device with the PoE device from which the pairing message is received.

11. A method for associating a controller of an adapter device with a Power over Ethernet (PoE) device among a plurality of PoE devices, each PoE device of the plurality of PoE devices being connected to a controller of an adapter device interconnected to other controllers of other adapter devices by a power-over-data linear bus to which an item of power source equipment is also connected, the method comprising the following steps, performed at the PoE device:

powering on the PoE device at an activation time different for each PoE device so that the powering on of the PoE devices does not overlap, and during the powering on of the connected PoE device:

upon powering on, sending a pairing message, the pairing message comprising a unique identifier of the PoE device;

receiving an acknowledgment message from a controller connected to the linear bus, the acknowledgment message comprising an identifier of the controller; and processing the received acknowledgment message for pairing the PoE device with the controller of the adapter device from which the acknowledgment message is received.

12. The method of claim 11, wherein the PoE device is powered on upon expiry of an activation time period, wherein the activation time period is different for each PoE device from the plurality of PoE devices.

13. The method of claim 12, wherein the activation time periods are computed such that the duration of exchange of messages over the power-over-data linear bus is short compared to the difference between two activation time periods.

14. The method of claim 12, wherein the activation time period is based on the voltage measured at the terminals of the adapter device controller from which the acknowledgment message is received.

15. The method of claim 12, wherein the PoE device ignores any acknowledgment message or pairing message received after the pairing.

16. The method of claim 12, wherein the activation time period is computed by means of a strictly monotonic function.

17. The method of claim 11, wherein sending a pairing message consists in broadcasting the pairing message.

18. Power over Cable (PoC) system comprising a plurality of Power over Ethernet (PoE) devices, each PoE device of the plurality of PoE devices being connected to a controller of an adapter device interconnected to other controllers of other adapter devices by a power-over data linear bus to which an item of power source equipment is also connected, wherein each controller of the adapter devices is configured to:

power on its connected PoE device at an activation time different for each PoE device so that the powering on of the PoE devices does not overlap, and upon receiving a pairing message from a PoE device during the powering on of its connected PoE device, the pairing message comprising a unique identifier identifying the PoE device, process the received pairing message for pairing the controller with the PoE device from which the pairing message is received.

* * * * *